July 6, 1937.                 D. J. STEWART ET AL                    2,086,482
                    CONTROL FOR AIR CONDITIONING SYSTEMS
                         Filed Nov. 12, 1931            2 Sheets-Sheet 2
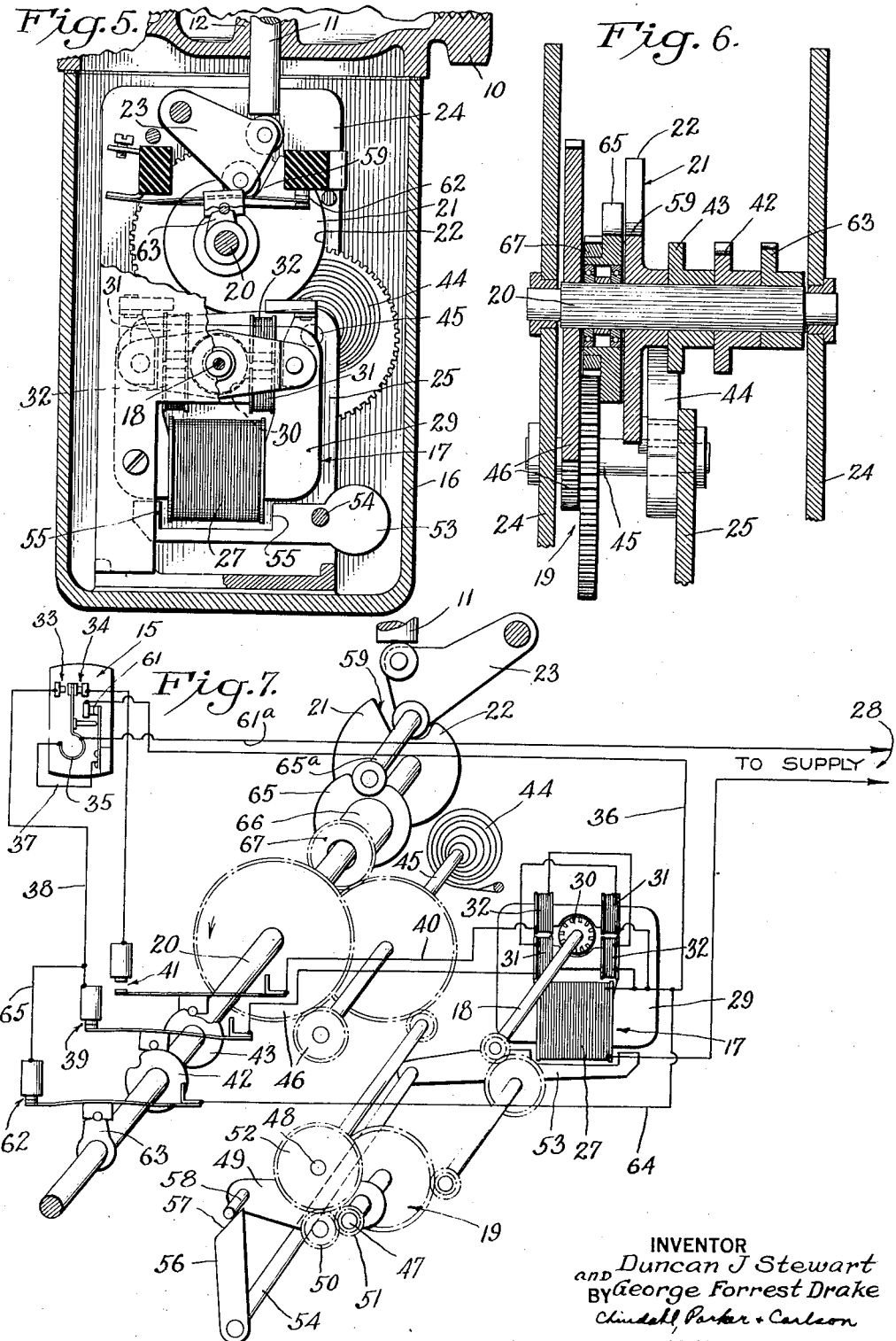
INVENTOR
Duncan J Stewart
AND George Forrest Drake
BY
Chindall, Parker + Carlson
ATTORNEYS Patented July 6, 1937

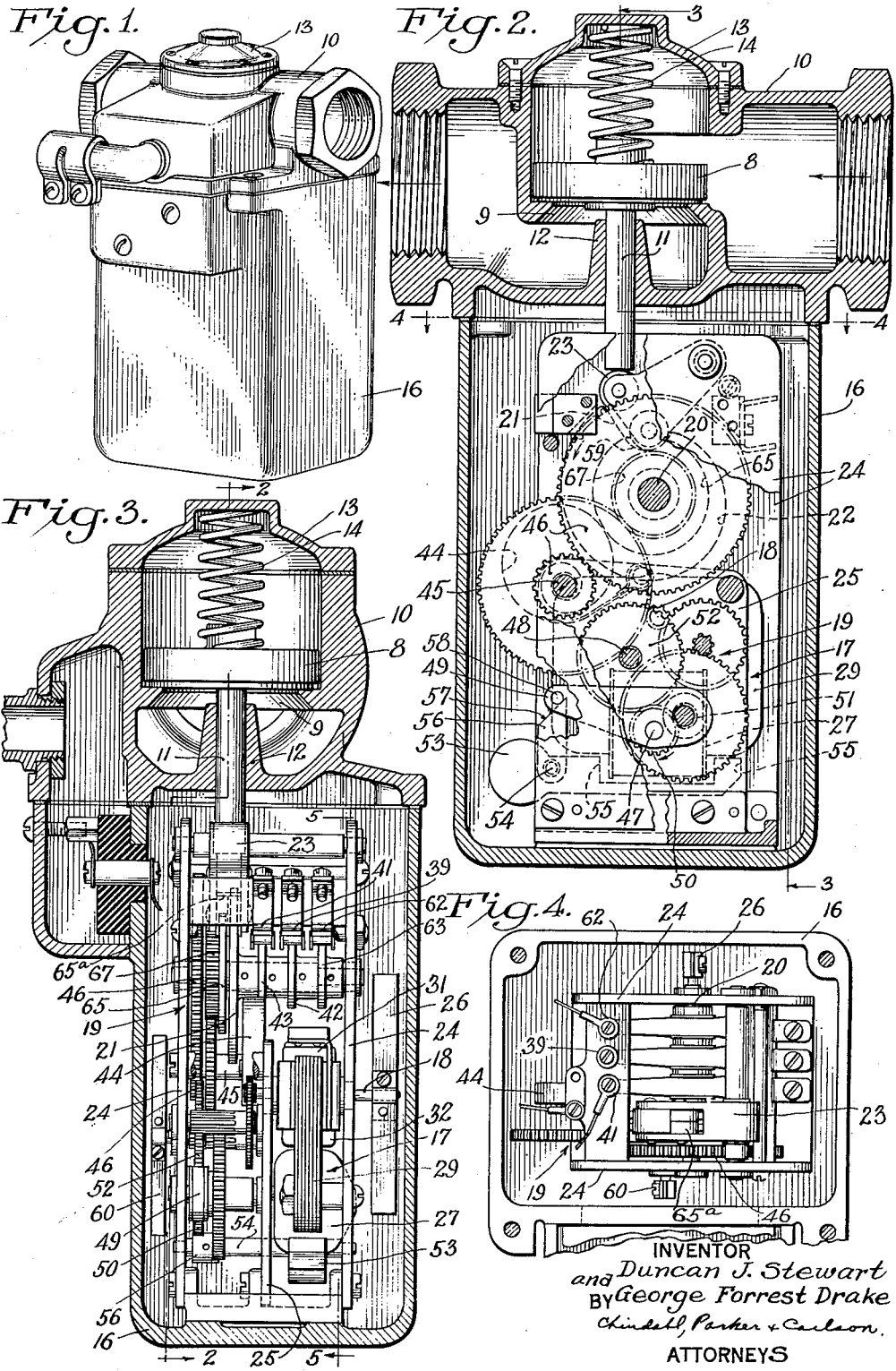

2,086,482

UNITED STATES PATENT OFFICE 2,086,482

CONTROL FOR AIR CONDITIONING SYSTEMS

Duncan J. Stewart and George Forrest Drake, Rockford, Ill., assignors to Howard D. Colman, Rockford, Ill.

Application November 12, 1931, Serial No. 574,474

36 Claims. (Cl. 236—74)

This invention relates in general to the control of systems for conditioning the air in buildings and more particularly to a system for governing the movements of a damper, valve or other device for regulating the condition of a room or other space.

One object of our invention is to provide for the control of a regulating device such as a valve or damper to effect movement thereof first substantially uninterruptedly through a fixed range of movement from one position to a partially open or intermediate position and then with a modulating action in another range beyond said intermediate position but in opposite directions as determined by a thermostat or other condition responsive means.

Another object is to provide a novel control mechanism for effecting operation of a regulating device in the manner above indicated through the medium of a power operator such as electric motor driving means.

Still another object is to provide for control of the power operator by separate control devices, one governing the fixed or uninterrupted movement of the regulating device and the other controlling the modulating movements thereof.

A more specific object is to provide a novel control mechanism by which the regulating valve device will be moved from closed to the position of minimum opening in response to a change in the temperature of the controlling medium to a predetermined value, will be maintained in this position as the temperature changes through a predetermined range in the same direction, and will be modulated back and forth to further open the valve passage as the temperature varies beyond said range.

A further object of the invention is to provide for the control of a burner regulating device in a heating system by a new and improved electrically driven operator which normally operates under thermostatic control to maintain the device between a predetermined partially open position and full open position, which permits complete closure of the device upon the occurrence of an abnormal condition such as failure of the current supply, and which restores the device at least to said partially open position automatically upon the discontinuance of such condition.

Another object of the invention is to provide, in a system of the above general character, a novel means for controlling the operator to cause movement of the regulating device to an inactive position in the event that the space heated by the system becomes overheated with the device in the partially open position above referred to.

A further object is to provide an electric operator for operating a regulating device and having means to effect a rapid movement of the device in leaving inactive position and a subsequent slow and graduated movement.

Still another object is to provide a novel electric operator which is particularly adapted for the control of a valve for regulating the amount of fuel delivered to a gaseous fuel burner.

Other objects and advantages of the invention will become apparent from the following detailed description taken in connection with the accompanying drawings, in which Figure 1 is a perspective view of a burner regulating device and operator therefor embodying the features of the present invention.

Fig. 2 is a vertical central sectional view of the unit shown in Fig. 1, the section being taken substantially along the line 2—2 in Fig. 3.

Figs. 3 and 4 are sectional views taken respectively along the lines 3—3 and 4—4 of Fig. 2.

Fig. 5 is a sectional view taken along the line 5—5 of Fig. 3.

Fig. 6 is a fragmentary sectional view taken substantially along a vertical plane including the axis of the main operating shaft.

Fig. 7 is a schematic view and wiring diagram.

While the invention is shown in the drawings as a means for operating a valve for regulating the operation of a gaseous fuel burner, it is to be understood that the invention is not limited to such use but is adapted for the actuation of other types of valve devices such, for example, as dampers controlling the flow of air or the like.

In the system exemplified in the drawings, the invention is applied to the control of a burner regulating device in a heating system. It comprises a valve disk 8 movable toward and from closed position against a seat 9 in a valve body 10 which is adapted to be interposed in the feed line leading to the gas burner (not shown). In this system, it will be observed that regulation of the burner operation is obtained by varying the amount of fuel supplied to the burner.

The stem 11 of the valve-member is mounted for vertical endwise reciprocation in a flange 12 and, for purposes to later appear, projects downwardly through the body 10. To permit convenient removal of the valve disk, the body 10 is formed opposite the stem with a large opening closed by a removable cover plate 13. A spring 14 acting in compression between the plate 13 and the valve disk 8 constantly urges the latter toward closed or inactive position.

To effect the desired control of the gas burner, the invention contemplates actuation, in the present instance, of the fuel control valve by an electrically driven operator acting automatically first, to maintain the valve open to a predetermined degree, for example, 20 per cent of full valve opening, under normal conditions; secondly, to effect slow and graduated movement of the valve member between full open and said partially open position in response to temperature changes in the space to be heated detected by a thermostat 15; thirdly, rapid and complete closure of the valve upon failure of the electric current supply to the operator or when the heat delivered with the valve in said partially open position produces overheating of the building; and fourthly, rapid and immediate restoration of the valve at least to said partially open position when normal conditions are again restored.

In order to effect proper lubrication of the valve operator, to simplify the speed-reducing mechanism and to exclude combustible gases from the control switches required, the operator is immersed in a bath of oil contained in a casing 16, preferably secured to the valve body on the underside thereof so as to avoid the necessity for providing an oil tight packing around the valve stem 11.

The valve operator comprises generally an electric driving means herein in the form of a motor 17 having its shaft 18 connected through a train 19 of speed reduction gears to a main operating shaft 20. Fast on the latter is an open-face cam 21 whose gradually rising surface 22 acts upon a follower arm 23 to raise and lower the valve stem 11 according to the angular position of the shaft 20. By reason of the bearing contact between the follower and the lower end of the stem 11, the valve disk 8 may be lifted out of the valve casing after removal of the plate 13.

The motor 17 and all of the shafts of the reduction gearing are supported by two spaced vertical plates 24 and an intermediate plate 25 rigidly secured together in spaced parallel relation and forming a frame which is secured to the casing 16. A paddle wheel 26 on the motor shaft assists in reducing the speed of movement of the shaft 20 without decreasing the starting torque of the motor.

In the present instance, the motor is of the reversible induction type and per se forms the subject matter of a copending application of Edgar D. Lilja, Serial No. 540,643, filed May 28, 1931 (now Patent No. 2,010,869, dated August 13, 1935). It is mounted between one of the side plates 24 and the plate 25 and has a main field winding 27 constantly energized under normal conditions from a source 28 of alternating current. The stator 29 is of the core type providing two poles on opposite sides of a rotor 30 of the squirrel-cage type preferably having its inductor bars exposed at the rotor surface.

Shifting of the magnetic field around the rotor is produced by the well known action of shading coils each enclosing one side portion of one motor pole and composed, in the present instance, of a relatively large number of turns of wire so as to reduce to a low value the current which flows through the thermostat switches. The coils are arranged in pairs 31 and 32 with the coil of each pair connected in series relation and disposed on diametrically opposite sides of the rotor.

When the winding formed by the coils 31 is rendered effectual by short-circuiting the same, the magnetic flux threading the sections of the poles enclosed by these coils will lag behind the flux threading the unshaded sections enclosed by the coils 32 and produce shifting of the magnetic field around the rotor in a counter-clockwise direction causing rotation of the rotor in the same direction and movement of the valve member 8 away from its seat. In a similar way, clockwise rotation of the rotor and closing of the valve takes place when the coils 32 are short-circuited with the circuit including the coils 31 remaining open. Owing to the poor single phase characteristics possessed by the motor above described, rotation thereof will cease when the circuits for both pairs of coils are interrupted and the position of the valve will be maintained by the friction in the speed-reducing gearing.

Selective short-circuiting of the coils 31 and 32 is controlled by the thermostat 15 which has two switches 33 and 34 with a common terminal carried by a thermo-responsive element 35 and disposed between the stationary switch contacts when the proper temperature prevails. When the thermostat is calling for heat, the switch 33 is closed thereby completing a circuit from the common terminal of the shading coils through conductors 36 and 37, the switch 33, a conductor 38 having a switch 39 therein to the coil 31. In a similar way, the insulated terminal of the shading coils 32 is connected by a conductor 40 with a switch 41 therein to the stationary contact of the thermostat switch 34.

The switches 39 and 41 limit the operation of the motor under the control of the thermostat 15, the former being held closed by a cam 42 on the shaft 20 except when the valve is fully opened. The switch 41 is allowed to remain open when the valve is closed and until the valve has been opened slightly beyond the predetermined degree above mentioned when the switch is closed by a cam 43 and held closed during further opening of the valve.

To provide for absolute safety in the control of the burner of the heating system with the operator above described, means is provided for detecting failure of the current supply at the motor and in response to such failure for releasing the normally engaged driving connection between the motor and the shaft 20, thereby permitting the latter to be restored to valve-closed position. Herein the disengageable connection is located intermediate the terminals of the speed-reduction gearing 19 so that the shaft 20 may be restored to valve-closed position by a spring 44 which herein is of spiral form acting upon a shaft 45 which is connected by speed-reduction gears 46 to the shaft 20.

The disengageable connection is located between the shafts 47 and 48 of the speed-reduction train and the spring 44 is constructed to exert a force capable of restoring the slow speed section of the gear train to valve-closed position when the connection is disengaged but is incapable of overcoming the friction in all of the gears and moving the same when the connection is engaged. Thus, with the connection engaged, the valve will be held in an intermediate position when both of the windings 31 and 32 are deenergized as will be the case when both of the thermostat switches 33 and 34 are open. The connection comprises an arm 49 swingable about the axis of the shaft 47 and carrying a gear 50 constantly meshing with a pinion 51 on the shaft 47 and also meshing with a gear 52 on the shaft 48 when the arm is in raised position as shown in Fig. 7.

Normally, the arm 49 is held in such raised position by a magnet which is adapted to detect failure of the current supply and release the arm. Inasmuch as the main winding 27 of the motor is constantly energized under normal conditions in the present instance, this winding and the core 29 thereof may constitute the magnet just referred to. The magnet armature is in the form of an arm 53 rigid with a rock shaft 54 and having one side cut away to receive the spool of the winding 27 so that the opposite ends 55 will lie close to the core 29 when the armature is attracted. The attractive force thus produced by the magnetic field which strays around the winding 27, is sufficiently powerful to raise the armature and cause meshing of the gears owing to the location of the disengageable gears in a relatively high speed portion of the gear train. On the opposite end of the rock shaft 54 is an arm 56 having a cam surface 57 which acts on a pin 58 and holds the arm 56 raised so long as the armature 53 is held up against the winding core 29 as shown in Fig. 5. Upon release of the armature, the pin 58 slides down the cam surface 57 but is limited in its movement so that it does not move out of engagement with the cam surface 57.

In the event of voltage failure, the armature falls, retracting the cam surface 57 and allowing the arm 49 to fall and carry the gear 50 out of mesh with the gear 52 whereupon the spring 44 will become effective to rotate the shafts 20 and 45 until the valve reaches closed position, movement of the shaft 20 being limited by engagement between the follower 23 and an abrupt surface 59 on the cam 21. The armature 53 is raised and the driving connection between the motor and the shaft 20 restored by the cam surface 57 when current is again available and the armature 53 is attracted to the core 29. By thus utilizing parts of the motor to form the voltage detecting means, the size of the operator unit and the cost of manufacture thereof are reduced materially.

A speed governor is provided which acts upon the high speed element of the mechanism driven by the spring 44 to prevent these parts from attaining a speed such that the teeth of the gears would be apt to be stripped when their motion is arrested. Herein the governor is in the form of a paddle wheel 60 (Fig. 3) fast on the shaft 45 and immersed in the oil contained in the casing 16. Such a governor does not decrease the effective torque of the spring but merely decreases the speed at which the parts are moved by the spring action.

It is contemplated that the amount of gas supplied to the burner of the heating system when the valve is in the predetermined partially open position above referred to, will not be sufficient to satisfy the ordinary demands upon the system. However, in very mild weather, a condition of excessive or prolonged overheating may arise in the operation of the burner with the valve in said predetermined position. In this event, it is desirable to close the valve completely which is preferably accomplished through the same means which causes closure of the valve upon voltage failure. To this end, the circuit for the main motor winding 27 is extended through the conductor 36, a switch 61, the conductor 37, and a conductor 61ª. The switch 61 is incorporated in the thermostat 15 and adapted to remain closed normally but to be opened by the thermal element 35 when the air surrounding the thermostat becomes heated two or three degrees above that for which the thermostat is set to respond. Thus, when such overheating occurs, the switch 61 will be opened thereby deenergizing the motor winding 27 and causing the driving connection with the shaft 20 to be disengaged and the burner regulating valve to be closed the same as in the case of voltage failure.

In order that the heat regulating device will, under normal conditions, always be open at least to the predetermined degree above referred to, means is provided for operating the motor independently of the thermostat 15 so as to move the valve to the partially open position upon restoration of normal conditions following closure of the valve due to voltage failure or overheating. This means comprises, in the present instance, an auxiliary circuit in parallel with the closed-when-cold switch 33 of the room thermostat and controlled by a switch 62 which is held closed by a cam 63 on the shaft 20 for all positions of the valve up to said predetermined or 20 per cent open position. One terminal of the switch 62 is connected by a conductor 64 to the common terminal of the shading coils while the other contact is joined by a conductor 65 to the conductor 38 between the switch 39 and the thermostat switch 33.

It will be seen that when the valve is closed, a circuit for the shading coils 31 will be established through the conductor 64, the switch 62, the conductor 65, the switch 39, and the conductor 38 so that upon the restoration of the current supply to the motor winding 27, the motor will be started in a direction to open the valve. When the valve has been moved through 20 per cent of its full opening movement, the cam 63 allows the switch 62 to open thereby breaking the auxiliary circuit and transferring the control of the shading winding 31 to the thermostat switch. The switch 41 for limiting the movement of the valve toward closed position under the control of the thermostat switch 34 is not closed until after the switch 62 has been opened; otherwise it might be possible for both of the windings 31 and 32 to be rendered effectual simultaneously with the result that the operator would become stalled.

To provide for rapid movement of the valve between the closed and the 20 per cent open position and at the same time avoid the use of steep surfaces on the slow moving actuating cam 21, the valve is arranged to be partially opened by an auxiliary cam 65 driven several times as fast as the cam 21 which, as above described, controls the movements of the valve between 20 per cent and full open positions. The auxiliary cam acts on a lateral extension 65ª of the follower 23 and is fast on a sleeve 66 having a pinion 67 meshing with a large gear on the shaft 45. With such a speed-increasing connection between the shaft 45 and the cam 65, the latter makes approximately fifteen revolutions for each revolution of the cam 21.

When the valve is completely closed, the follower is disposed in notches between the high and low points of the two cams. As the motor starts rotating in a direction to turn the shaft 20 counter-clockwise, the cam 65 makes nearly a complete revolution before the trailing edge of the notch in the cam 21 engages the follower 23. During this movement, the cam 65 raises the valve disk 8 to the 20 per cent open position which corresponds to the low point on the surface of the cam 21. In the first revolution of the cam 65, the low point on the surface 22 moves in under the follower before the high point on the cam 65 leaves the follower. Thereafter, the slow cam 21 holds the follower away from the surface of the fast cam.

From the foregoing it will be apparent that under normal conditions, that is, when current is available and the air surrounding the thermostat 15 is not overheated, the valve disk will be supported by the surface 22 of the slow cam 21 and will move slowly and at a uniform rate toward full open position. This movement continues so long as the thermostat 15 calls for heat thereby gradually increasing the amount of heat delivered by the system. Opening of the switch 39 when the valve has been fully opened interrupts the circuit for the winding 31 thereby stopping the motor, the valve remaining open. Reverse movement occurs when the temperature in the space heated by the system exceeds that for which the thermostat is set to respond and such movement continues until the thermostat switch 34 becomes opened or the valve reaches the partially opened position at which time the limit switch 41 is opened whereupon the motor stops. In this way, the valve floats back and forth between partially and fully open position so long as normal conditions prevail, the thermostat 15 being effective to control the extent as well as the direction of movement of the valve.

In the event of voltage failure or excessive overheating of the building, the gear connection between the motor and valve member is broken and the spring 44 becomes effective to turn the shaft 20 and the slow speed section of the gear train toward valve-closing position at a speed determined by the resistance offered by the oil to rotation of the paddle wheel 60. In such movement, the switch 62 is closed thereby preparing the independent circuit for energization of the valve-opening winding 31 immediately upon discontinuance of the abnormal condition. Upon reenergization of the winding 27, the gear connection is reengaged automatically and the motor started in a direction to open the valve. In the first revolution of the cam 65, the disk 8 is raised to its 20 per cent open position where it is held by the low point on the surface 22. Shortly after the valve reaches this predetermined partially open position, the switch 62 is allowed to open whereupon the movement of the valve is arrested unless the thermostat is then calling for heat. In the latter event, the winding 31 continues to remain energized through the thermostat switch 33 and the valve continues to open until the existing demands in the building are satisfied.

After the regulating device or valve member 8 has been moved to the closed position shown in the drawings in response to opening of the thermostatically actuated switch 61, the device is operated in the following manner as the room temperature reverses and then decreases progressively. When the temperature for which the switch 61 is set is reached, closure of this switch energizes the electric operator whereupon the connection with the valve member is restored and, by virtue of the independent short circuit for the shading coils 31 established through the then closed switches 39 and 62, the valve member is moved uninterruptedly to the position of minimum opening which is determined by opening of the switch 62, the control of the operator being transferred to the thermostat switches 33 and 34 by closure of the switch 41.

The valve member remains in the position partially opening the valve passageway during the change in temperature intervening between the closure of the switch 61 and the operating temperature range of the thermostat which as above set forth is a few degrees below that at which the switch 61 becomes closed. When the room temperature has fallen sufficiently to close the switch 33, the motor windings 31 are rendered effectual to cause further opening movement of the valve member which, in the present instance, is determined by the period during which the switch 33 remains closed. Thus as the room temperature varies above the value at which the switch 34 is operated, the valve member is moved back and forth thereby modulating the flow of fluid through the valve passageway between the minimum and maximum rates.

We claim as our invention:

1. In a heating system, the combination of a device for regulating the operation of the fuel burner in said system, a rotary electric motor having a main field winding normally energized and two windings selectively energizable to determine the direction and extent of rotation of the motor shaft, a thermostat controlling the selective energization of said second windings, a speed-reducing mechanism providing a driving connection between said device and said shaft and having two parts tending to disengage and thereby break the connection, and means for maintaining said parts engaged so long as current is applied to said main winding including an armature attracted toward the stator of the motor by the stray magnetic field around the latter when said main winding is energized.

2. In an air conditioning system, the combination of a device for regulating the system and normally tending to move into an inactive position, a rotary electric motor having a stator core and a winding thereon, sensitive control means governing the operation of said motor, means providing a driving connection between the shaft of said motor and said device and having two parts tending to disengage and permit movement of said device into inactive position independently of said motor shaft, and means for maintaining said connection so long as current is available for said motor including a magnet formed by said core and said winding.

3. In combination with a movable regulating device, a driving shaft having a driving connection with said device normally tending to release and permit movement of the device independently of the shaft, an electric motor and a magnet having a common winding and two armatures one for driving said shaft, the other controlling the release of said connection, and sensitive control means for governing the operation of said motor.

4. In an air conditioning system, the combination of a device movable in opposite directions between open and closed positions to vary the operation of said system, two rotary cams operable upon said device successively in the movement of the device from closed to open position, thermostatically controlled electric motor driving means having a rotary shaft, an intermediate shaft, a driving connection between said intermediate shaft and the cam controlling the movement of said device out of closed position, a speed-reducing drive connection between said intermediate shaft and said other cam adapted to cause movement of the device at a speed substantially slower than the other cam, and means providing a speed-reducing drive connection between said shafts adapted to be released automatically upon failure of current supply to said motor whereby to permit restoration of both of said cams to a position to close said device independently of said driving means.

5. In an air conditioning system, the combination of a device movable in opposite directions between open and closed positions to vary the operation of said system, an open-face cam adapted in a single revolution to move said device from closed position to a predetermined partially open position, a second open-face cam shaped to permit complete closure of said device and operable to take control of said device after partial opening thereof by said first cam, electric motor driving means, a rotary shaft driven thereby, thermostatic means controlling said driving means to determine the direction and extent of movement of said shaft, and means providing a driving connection between said shaft and each of said cams to drive the first cam at a substantially greater speed than the second cam.

6. In an air conditioning system, the combination of a regulating device movable between two limit positions, electric power driving means having a rotary shaft, a sensitive control means controlling said driving means to determine the direction of rotation of said shaft, two cams arranged to be driven at different speeds from said shaft, the faster cam being adapted to move said device from one of said positions to a predetermined position intermediate said limit positions, the other cam controlling the movement of said device beyond said intermediate position.

7. In a temperature control system, the combination of a regulating device movable between open and closed positions, reversible electric motor driving means, speed-reducing mechanism driven by said motor driving means, means driven by said mechanism and operable to impart rapid movement to said device between closed position and a predetermined partially open position and to impart a slower movement to said device in opposite directions between said partially open position and full open position, and a thermostat controlling said driving means to determine the direction and extent of movement of said device between said open and partially open positions.

8. In a heating system, the combination of a regulating device movable in opposite directions between closed and fully open positions, electric motor driving means, means providing a driving connection between said driving means and said device adapted to effect a rapid movement of the device from closed position to a predetermined partially open position and a substantially slower movement of the device between said partially open position and fully open position, a thermostat controlling said driving means between partially and fully open positions to determine the direction and extent of movement thereof, and means controlling the operation of said driving means independently of said thermostat during movement of the device between closed and said partially open positions.

9. In an air conditioning system, the combination with a regulating device movable between two limit positions, electric motor driving means, a driving connection between said driving means and said device adapted to impart an uninterrupted movement of predetermined length and then a graduated motion to said device during operation of the driving means in moving the device from one of said limit positions to the other, sensitive control means variably controlling said driving means during said graduated motion in response to air condition changes and independently operable means controlling said driving means during said uninterrupted movement.

10. In a system for controlling the flow of gaseous fuel, the combination of a casing providing a fuel passageway and having a valve seat therein, a valve member movable downwardly and upwardly toward and away from said seat, a stem for said member projecting downwardly through said casing, an electrically driven operator associated with the lower end of said stem and arranged to be controlled thermostatically, electric switching means within said casing also controlling said operator, a removable cover on the side of said casing opposite said operator adapted when removed to permit withdrawal of said valve member and said stem from the casing, and a housing for said operator filled with lubricating fluid at least to a level above said switching means.

11. In an air conditioning system, the combination of a regulating device movable in opposite directions between closed and open positions, electric motor driving means for actuating said device, a thermostat controlling the operation of said driving means to cause movement of said device between a predetermined partially open position and a fully open position, means operable independently of said thermostat to control said driving means while said device is moving between closed and said partially open positions, and switching mechanism operable in timed relation to the movement of said device to transfer the control of said driving means from said independent means to said thermostat and vice versa as said device passes through said partially open position in opening and in closing.

12. A control for air conditioning systems having, in combination, a valve controlling a passageway and having a member movable between closed and open positions, a power operator for actuating said member including electric motor driving means having two windings selectively operable to cause movements of said member in opposite directions, condition responsive means selectively controlling said windings to determine the direction and extent of movement of said member by said operator between a predetermined position partially opening said passageway and a more fully opened position whereby to modulate the flow of fluid through said passageway, and an independent circuit for rendering the valve opening winding effectual to cause movement of said member to said partially open position, said last mentioned circuit including a switch operated independently of said condition responsive means.

13. A control for air conditioning systems having, in combination, a valve controlling a passageway and having a member movable between closed and open positions, a power operator for actuating said member including electric motor driving means having valve opening and valve closing windings selectively energizable to effect movements of said member toward open and closed positions, circuits for the respective windings each including a control switch, a third switch in series with said valve closing control switch and maintained open when said member is closed or between closed and a predetermined partially open position and closed when the member is opened beyond such position, condition responsive means selectively controlling said control switches to determine the direction and extent of movement of said member between said partially and fully open positions, and an independent circuit for rendering the valve opening winding effectual to cause partial opening of said valve including a switch connected in parallel with the opening winding control switch and arranged to be closed when said member is closed or between closed and a predetermined partially open position and opened when the member is opened beyond such position.

14. In an air conditioning system, the combination of a regulating device movable in opposite directions between closed and open positions, electric motor driving means operatively connected to said device and having two windings selectively energizable to cause opening or closing movement of said device, condition responsive means having a switch controlling a gap in the circuit of said opening winding and a second switch in the circuit of said closing winding, a second circuit for said opening winding having a switch therein in parallel with said first mentioned switch, a limit switch in the circuit of said closing winding, and means operating automatically upon opening of said device to maintain said third mentioned switch closed and said limit switch open until the device has reached a predetermined partially open position and then to open said third switch and close said limit switch successively.

15. In a heating system, the combination with a device movable in opposite directions between closed and open positions to regulate the operation of a fuel burner, said device normally tending to move to closed position, electrically operated driving means having a connection with said device which is normally engaged during application of electric current to said driving means but adapted to be released automatically and permit closure of said device upon failure of the current supply, a thermostat controlling said driving means and acting to determine the direction and extent of movement of the device between a predetermined partially open position and a fully open position, and means controlling said driving means to cause movement of said device to said partially open position independently of said thermostat upon restoration of the current supply for said driving means following release of said connection.

16. In a heating system, the combination with a device movable in opposite directions to vary the operation of the fuel burner of said system, said device normally tending to move into an inactive position in which the burner operation is interrupted, an electric motor, a driving connection between said motor and said device adapted to be maintained when said motor is energized but to be released and thereby permit movement of the device to interrupt the burner operation when the motor becomes deenergized, a thermostat responsive to temperature changes in the space to be heated by the system and controlling said motor to determine the direction and extent of movement of said device, and a switch incorporated in said thermostat and normally maintaining a closed circuit for the motor during normal temperature changes in the space being heated, said switch operating to cause deenergization of the motor upon a predetermined degree of overheating in said space.

17. In a heating system, the combination of a device movable in opposite directions between open and closed positions to regulate the operation of temperature changing apparatus, a power operator for said device controlled in accordance with temperature changes in the space to be heated by said system and normally effectual to move said device back and forth varying distances progressively between a predetermined partially open position and full open position according to temperature changes in said space, and means operable in response to a condition of excessive overheating in said space to control said operator and cause said device to be moved more quickly and without interruption to completely closed position regardless of the position occupied by the valve at the occurrence of said condition.

18. In a heating system, the combination of a device movable in opposite directions between open and closed positions to regulate the operation of temperature changing apparatus and normally tending to move to completely closed position, a power driven operator for moving said device toward open position, thermostatic means controlling said operator to cause movement of said device back and forth between partial open position and full open position according to temperature changes in the space heated by said system, and auxiliary thermostatic means acting automatically to release said device and permit movement of the same to closed position automatically upon the occurrence of a predetermined condition of overheating in said space.

19. In a temperature control system, the combination of a regulating device, electrically operated driving means therefor, thermostatic means controlling said driving means, a rotary shaft driven by said means and having a spur gear thereon, a shaft having a driving connection with said device and having a spur gear fast thereon, an arm swingable about the axis of said first mentioned shaft and having a gear thereon for establishing a driving connection between said spur gears, a cam member arranged to be actuated by electromagnetic action and to move said arm in a direction to cause meshing of said gears, and a spring acting to turn said second shaft and move said device to inactive position upon withdrawal of said cam member by failure of the current supply to said driving means.

20. In a heating system, the combination of a regulating device normally tending to move into an inactive position, electric driving means for said device, a thermostat controlling the operation of said driving means, a driving connection between said driving means and said device having a pair of disengageable gears, means responsive to the application of electric current to said driving means for normally maintaining engagement of said gears but permitting disengagement thereof upon failure of said current supply, and a speed-governor acting to restrain the movement of said device upon release of said connection whereby to prevent stripping of the gear teeth in the event of restoration of the current supply before said device reaches closed position.

21. In an air conditioning system, the combination of a device movable in opposite directions between two limit positions, a reversible electric motor driving means for moving said device in opposite directions, a sensitive control instrumentality governing the operation of said driving means between one of said positions and a predetermined intermediate position and acting to determine the direction and extent of movement of the device between said last mentioned positions, and means controlling said driving means independently of said instrumentality through a predetermined range of movement terminating at said intermediate position.

22. A condition-control system comprising a condition-responsive means, a condition-control means including a fluid-supply valve, means controlled by said condition-responsive means for modulating the opening of said valve, means to cause a quick action of said valve between its closed position and a predetermined minimum opening so as to prevent the valve from slowly seating or unseating, and means to quickly close said valve from any open position.

23. In combination, a fluid-control valve, means to cause a quick movement of said valve up to a predetermined minimum opening, means to cause a modulated movement of said valve between said minimum opening and full opening, and safety means to cause rapid closing of said valve from any position.

24. A control system of the class described comprising, in combination, a valve having a member normally urged toward closed position, a reversible electric motor, mechanism driven thereby and operating to impart rapid uninterrupted movement to said valve member between closed and partially open positions and slower graduated regulating movements of varying lengths between said partially open position and fully open position, a sensitive control instrument governing the operation of said motor to determine the direction and extent of movement of said member between said partially and fully open positions, and means providing a driving connection between said motor and said mechanism releasable to permit quick closure of said member from any position.

25. A control system having, in combination, a valve, a movable actuating member, a power actuator including reversible electric motor driving means, mechanism driven thereby and operating to impart uninterrupted movement to said member between closed position and a position partially opening the passageway through said valve and graduated regulating movements of varying lengths between said partially open position and a more fully open position, and a sensitive control instrument governing the operation of said motor driving means to determine the direction and extent of movement of said member between said partially and fully open positions.

26. A control for air conditioning systems having, in combination, a valve controlling a passageway and actuated by a member movable between passage closed and open positions, a power operator for moving said member in opposite directions including electric motor driving means, two circuits selectively controlling said driving means to determine the direction and extent of movement of said member by said operator between a predetermined position partially opening said passageway and a more fully opened position, condition responsive means selectively controlling said circuits to modulate the opening of said valve, and a third circuit controlling said motor driving means to cause partial opening of said valve, said last mentioned circuit including a switch responsive to the movements of said member and maintained closed until said member is moved to said partially open position and open in the further movement of the member.

27. A control for air conditioning systems having, in combination, a valve controlling a passageway and actuated by a member movable between passage closed and opened positions, a power operator for actuating said member including electric motor driving means having two windings selectively operable to effect movements of said member in opposite directions respectively, condition responsive means selectively controlling said windings to determine the direction and extent of movement of said member by said operator between a predetermined partially open position and a more fully opened position, a circuit for rendering the valve opening winding effectual to cause partial opening of said valve, said last mentioned circuit including a switch responsive to the movements of said member and maintained closed until the valve is partially opened, and switching means operating automatically in response to the movements of said member to prevent effective energization of said valve closing winding by said condition responsive means during the operation of said last mentioned circuit.

28. A control for air conditioning systems having, in combination, a valve controlling a passageway and having a member movable between closed and opened positions, a power operator for actuating said member including electric motor driving means having windings selectively operable to effect movements of said member in opposite directions, means controlling the selective energization of said windings to determine the direction and extent of movement of said member between a predetermined partially open position and a more fully opened position whereby to modulate the valve opening, a condition responsive device controlling said last mentioned means, auxiliary switching means controlling said motor driving means to cause substantially uninterrupted movement of said member from closed to said partially open position, and spring means adapted when rendered active to move said member to closed position independently of said operator.

29. A control system having, in combination, a valve controlling a fluid passageway and having a member movable between closed and opened positions, a power operator for actuating said member to modulate the degree of valve opening, means controlling said operator to effect continuous movement of said member from closed position to a predetermined position partially opening said passageway, a device responsive to a condition to be controlled, and means controlled by said device independently of said first mentioned control means to govern the selective operation of said operator to cause variable movements of said member in opposite directions between said partially open position and a more fully open position whereby to modulate the increased rate of fluid flow through said passageway.

30. The combination of valve means controlling the flow of fluid through a passageway, a device variably movable to operate said valve means, a power driven actuator for said device, means controlling the application of motive power to said actuator to cause uninterrupted movement of said device between closed position and a predetermined minimum position partially opening said passageway and modulating movements between said partially open position and a position more fully opening the passageway whereby to graduate the rate of fluid flow above a minimum rate, said means including an instrument responsive to a condition to be regulated and operative to determine the direction and extent of said modulating movements.

31. A temperature control system having, in combination, a valve controlling a passageway and having a member movable between closed and opened positions, a power operator for actuating said member including electric motor driving means having windings selectively operable to effect movements of said member in opposite directions, means actuated thermostatically in response to temperature changes within a predetermined range and selectively controlling said windings to determine the direction and extent of movement of said member by said operator between a predetermined partially open position and a more fully opened position, and means actuated thermostatically in response to the existence of a predetermined temperature outside of said range and controlling said operator to cause substantially uninterrupted movement between closed and said partially open positions.

32. A control for an air conditioning system having, in combination, a valve controlling the flow of fluid through a passageway and actuated by a member movable between positions closing and substantially fully opening said passageway, a power operator for actuating said member and operating in a continuous cycle of fixed length to move said member between closed position and an intermediate partially open position, said operator acting in cycles of variable length to move said member varying distances back and forth between said minimum and fully open positions whereby to modulate the further opening of said passageway, and thermostatic means controlling said operator to cause operation thereof through said fixed cycle in response to one temperature and through said variable cycles in response to different temperatures.

33. A control for an air conditioning system having, in combination, a valve controlling a fluid passageway to govern the temperature of the air in a space to be conditioned and having a member movable between positions closing and opening said passageway, a power operator for actuating said member, and thermostatic means in said space controlling said operator to cause movement of the member from said closed position to a predetermined minimum open position in response to the existence of a predetermined temperature in the space and to modulate the movement of said member back and forth between said minimum open position and a position more fully opening said passageway according to variations of the space temperature within a range different from said predetermined temperature, said member being maintained in said minimum position as the space temperature varies within a range intervening between said predetermined temperature and said modulating range.

34. A temperature control system having, in combination, a valve device movable between closed and open positions to vary the rate of fluid flow through a passageway and thereby regulate the temperature of a medium to be controlled, thermostatic means responsive to temperature changes of said medium and arranged to detect the existence of a plurality of predetermined different temperature values, and power operated mechanism for actuating said device under the control of said thermostatic means and operating to cause substantially uninterrupted movement of said device from closed to a predetermined intermediate position when one of said temperature values prevails in said medium, to maintain the device in such intermediate position as the medium temperature changes to said other value, and to cause modulating movement of said device varying distances back and forth between said intermediate position and a more fully open position as the medium temperature varies beyond such other value.

35. The combination of a valve, a device for actuating the valve to close and variably open the control passage control thereby, electric motor driven means for moving said device including two actuating elements, one operative to impart movement to said device from a valve closed position to a partially open intermediate position, and the other operative to impart regulating movements to said device of varying lengths and in opposite directions between said intermediate position and a more fully valve open position, and a sensitive control instrument responsive to a condition to be controlled governing the operation of said motor driven means to determine the direction and extent of said regulating movements.

36. The combination of a valve device to be operated, electric motor driven means for moving said device including two actuating elements, one operative to impart movement to said device from a closed position to a partially open intermediate position, the other being operative to impart regulating movements to said device of varying lengths and in opposite directions between said intermediate position and a more fully open position, and electromagnetically controlled means for causing movement of said device from any position to closed position.

DUNCAN J. STEWART.
GEORGE FORREST DRAKE.

CERTIFICATE OF CORRECTION.

Patent No. 2,086,482.                                                      July 6, 1937.

DUNCAN J. STEWART, ET AL.

It is hereby certified that error appears in the printed specification of the above numbered patent requiring correction as follows: Page 5, first column, line 50, claim 8, for the words "a heating" read an air conditioning; page 8, first column, line 31, claim 32, for "length" read lengths; and second column, line 29, claim 35, strike out "control" first occurrence; and that the said Letters Patent should be read with these corrections therein that the same may conform to the record of the case in the Patent Office.

Signed and sealed this 19th day of October, A. D. 1937.

Henry Van Arsdale.
(Seal)                                                            Acting Commissioner of Patents.